(No Model.)
G. W. SMILLIE.
CAR COUPLING.
No. 511,220.  Patented Dec. 19, 1893.
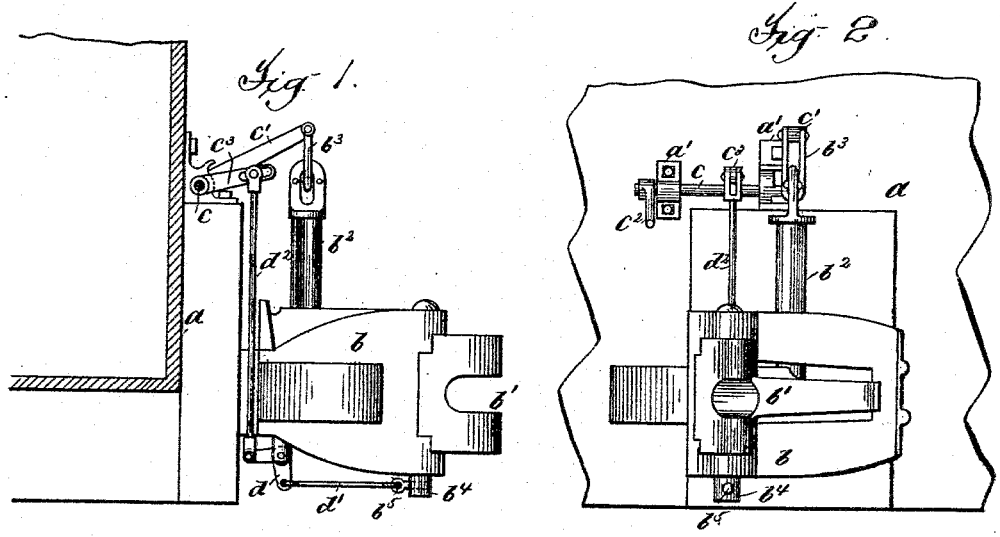
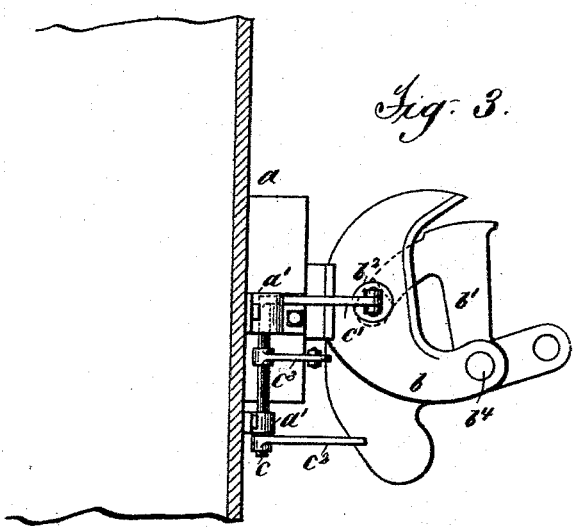
Attest:
Geo. H. Botts.
A. L. Hayes.
Inventor:
George W. Smillie
by Chas. F. Dane
his Atty.

UNITED STATES PATENT OFFICE.

GEORGE W. SMILLIE, OF NEWARK, NEW JERSEY.

CAR-COUPLING.

SPECIFICATION forming part of Letters Patent No. 511,220, dated December 19, 1893.

Application filed July 11, 1892. Serial No. 439,614. (No model.)

*To all whom it may concern:*

Be it known that I, GEORGE W. SMILLIE, a citizen of the United States, residing in Newark, Essex county, and State of New Jersey, have invented new and useful Improvements in Car-Couplers, of which the following description, taken in connection with the drawings herewith accompanying, is a specification.

My present invention consists of improvements upon an application of mine now pending, bearing Serial No. 432,558 and filed May 11, 1892, and relates more particularly to the hook or knuckle operating mechanism, the object of this invention being to provide a cheap and simple device or mechanism whereby the hook or knuckle of the coupler may be released by its locking device and be drawn or moved to an open or extended position immediately upon such releasement, at one and the same operation, by means of a single operating lever through the medium of connecting mechanism. This object I accomplish by the means hereinafter set forth in detail and pointed out in the claims.

Referring to the drawings:—Figure 1 represents the side elevation of a coupler and its operating mechanism, embodying my invention, in position upon a car with its hook or knuckle in an open or extended position, and Figs. 2 and 3, represent a front and top view respectively, of the same.

To explain in detail,—$a$, represents a portion of a car-body; $b$, the draw-head of the coupler attached to said car-body; $b'$, the hook or knuckle hinged to said draw-head; $b^2$, the locking pin or bolt for locking said hook or knuckle in a closed position, and $c$ the operating lever which is supported in suitable bearings $a'$, $a'$, upon the end of the car-body $a$, and is provided with an arm $c'$ projecting outwardly from the face of the car, which is connected at its free end with the upper end of the locking-pin or bolt $b^2$ through the medium of a connecting link $b^3$. This operating lever is also provided with an arm or handle $c^2$ at or adjacent to its free end as a means for operating the same.

According to my present invention, I make the hook or knuckle $b'$ fast with its pivot-pin $b^4$ in a manner to turn or rotate therewith, by means of a connecting pin or other suitable means (not shown in the drawings), the means for connecting said parts not affecting the spirit of my invention. Said pivot-pin is provided with a cotter-pin or other arm or projection $b^5$ in its lower end at a point exterior of the draw-head, having one end projecting laterally therefrom in a line substantially parallel with the front or engaging end of the hook or knuckle $b'$ as shown. An elbow-lever $d$ is pivoted on the draw-head adjacent to its rear end, and is connected at one end with the projecting end of said cotter-pin or arm $b^5$, through the medium of a connecting rod $d'$, and the opposite end of said elbow-lever $d$ has connection with an arm $c^3$ of the operating lever $c$ through the medium of a connecting rod $d^2$. By this described combination and arrangement of parts, the locking-pin or bolt $b^2$ may be raised or moved from engagement with the hook or knuckle $b'$ by means of its operating lever $c$, and immediately upon such disengagement, the arm $c^3$ of the operating lever $c$ begins to act upon, or raise, the connecting rod $d^2$ and operate the elbow-lever $d$ to draw the hook or knuckle $b'$ to an open or extended position through the medium of the connections as described. The operator is thus enabled to release the hook or knuckle and open the same at one and the same operation of the operating lever $c$, the advantage of this positive action of the operating parts, without the employment of springs, &c., being obvious.

The action of the operating lever $c$ upon the knuckle opening device or mechanism, at the proper time or when the locking bolt or pin has moved from its engagement with the knuckle $b'$, is secured in the present instance shown, by slotting the arm $c^3$ of the operating lever $c$ at its point of connection with the rod $d^2$ in order to allow the end of the latter to move freely or loosely therein without being acted upon, until the locking pin has been moved from engagement with the knuckle, at which time the said arm $c^3$ begins to raise the rod $d^2$ and operate the connecting parts to draw the hook or knuckle to an open or extended position as shown. It is obvious however that the slot at the point of connection between the arm $c^3$ and the rod $d^2$, might be located in the latter in lieu of in the former as shown, or a link be employed to secure the desired action between the parts as described, without departing from the spirit of my invention.

Another important feature of my invention also consists in the location of the knuckle opening mechanism and in the manner of its connection with the hook or knuckle, in a manner whereby it may be applied to any "vertical-plane" coupler without necessitating any change of construction in the latter, and also in the fact of its being located at the exterior of the draw-head and independent of the other working parts of the coupler; thus obviating the liability of its effecting any of the regular working parts of the coupler, in case of its removal, loss, breakage or other accident, the advantage of which is obvious.

Having thus set forth my invention, what I claim as new, and desire to secure by Letters Patent of the United States, is—

1. In combination with a car-coupler provided with a hinged hook or knuckle and a locking pin or device, of an operating lever connected with the locking-pin or device through the medium of a link connection, and with the pivot-pin or arm of said knuckle at a point exterior of the draw-head, through the medium of a pivoted lever and suitable connections, in a manner to release said hook or knuckle from its locked position and open the same, substantially as described and for the purpose set forth.

2. In combination with a car-coupler provided with a hinged hook or knuckle and a locking pin or device, of an operating lever provided with an arm having connection with said locking pin or device, and a second arm having connection with the pivot-pin or arm of said knuckle at a point exterior of the draw-head through the medium of a pivoted elbow lever and connecting means, substantially as described and for the purpose set forth.

3. In combination with a car-coupler provided with a hinged hook or knuckle and a locking pin or device, an operating lever provided with an arm having connection with said locking pin or device to operate the same, of an elbow-lever pivoted on the coupler and connected at its opposite ends with the cotter-pin or other projection on the pivot-pin of the knuckle, and with an arm of said operating lever, respectively, through the medium of suitable connecting means, substantially as described and for the purpose set forth.

4. In combination with a car-coupler provided with a hook or knuckle hinged thereto, and a locking-pin or device, of an operating lever provided with an arm having connection with the said locking-pin or device, and a second arm having a loose or sliding connection with a knuckle opening device connecting said second arm and the pivot-pin or arm of the knuckle, substantially as described and for the purpose set forth.

GEO. W. SMILLIE.

Attest:
CHAS. F. DANE,
A. L. HAYES.